United States Patent Office 3,325,425
Patented June 13, 1967

3,325,425
SPRAY DRYING OF AQUEOUS ACRYLIC POLYMER DISPERSION PAINTS
Walter J. Bray, Jr., Longmeadow, Mass., assignor, by mesne assignments, to Monsanto Company, a corporation of Delaware
No Drawing. Filed Dec. 3, 1962, Ser. No. 241,519
4 Claims. (Cl. 260—17)

This application is a continuation-in-part of application Ser. #9,340, filed on Feb. 17, 1960, and now abandoned.

The present invention pertains to spray-drying of aqueous dispersion paint compositions and products obtained thereby. More particularly, this invention pertains to the spray-drying of acrylic polymer dispersion paints generally, including both the normally plasticized and the unplasticized types.

Dry powdered water-dispersible surface coating compositions are known. These compositions are obtained by mixing the solid constituents in dry form so as to yield a powder, which can when needed, be dispersed in water to form the liquid coating composition. More advantages result from the greater stability and decreased bulk of the dry coating composition.

Extensive commercialization of the water-dispersible dry paint compositions has not been realized, largely because the known compositions do not yield porducts having properties as satisfactory as the available liquid compositions. To be more specific the known dry compositions when dispersed in water to form liquid paints do not have as good application properties as do the available liquid compositions nor are the final properties of the air-dried films from the former compositions as satisfactory. A major reason for poorer properties in liquid paints obtained from dry compositions is the absence of certain liquid agents normally contained in aqueous dispersion paints which impart excellent application and film properties. These agents are the well known plasticizers and coalescing agents, which are generally organic liquids having a solvation effect on the resin binder in the paint. The most efficient plasticizers and coalescing agents being liquid, if included in the dry composition in useful quantities would so agglomerate the dry powdered composition as to destroy or greatly reduce the water redispersibility of the mixture.

Another major reason for the lack of commercialization of water-dispersible dry powdered paint compositions is the inability heretofore to prepare such compositions from certain known resin binders which are enitrely satisfactory for use in the liquid paint compositions. These resin binders can be generally characterized as being so soft or possessing such low fusion temperatures that the individual discrete resin particles constituting the resin binder would fuse at room temperatures even in the absence of plasticizers and/or coalescing agents. For example, if an acrylic interpolymer resin binder were employed in useful quantities to prepare a dry powdered water-dispersible paint composition by the usual methods the resulting composition would exhibit the same general detrimental agglomeration effects described heretofore.

The applicant has found however, that by utilizing the method hereinafter disclosed, for the preparation of the dry powdered paint composition, that all types of resin binders normally employed for the preparation of liquid aqueous dispersion paints may be used along with plasticizers and/or coalescing agents, to form a readily water-dispersible dry powder product, essentially free from agglomeration.

It has further been found that the dry powdered paints of the present invention, when redispersed in liquid form and applied, will air-dry to yield films which have substantially improved brightness over like films obtained from the original liquid paint compositions. The compositions of the present invention are free-flowing dry powders having good storage stability. Further, the free-flowing characteristics of these products are retained during storage for periods of at least one year. The compositions can be generally characterized as capable of reconstitution simply by mixing with water to form stable aqueous paints substantially equivalent to a paint made up in liquid form originally. The compositions can be further specifically characterized by the properties of films cast from the reconstituted dispersions and air-dried, in that such films have good scrubability, flexibility, and adhesion, and in addition have the improved brightness mentioned hereinbefore.

The present improved products may be obtained by drying the aqueous paint dispersions using a properly controlled continuous process of spray drying. As is common in such processes, the aqueous paint dispersion is disintegrated into fine particles by atomizing the same in a stream of air. The current of atomizing air should be of such high velocity relative to that of the stream of aqueous dispersion paint as to be capable of atomizing the paint into particles or globules consisting in large part substantially of the solid resin, pigment, pigment extender, thickener, or other water-insoluble constituents of the paint, with an envelope of the suspending medium (water with dispersing agent) about them.

This two-fluid atomization is well understood in the art, and it will be apparent that the relative velocities of the two fluids will be so chosen as to produce the requisite degree of disintegration of the paint dependent upon the sizes of the suspended particles in the paint. Where the original paint has a high solids content, say about 50 to 65%, it is desirable to dilute it to about 25 to 45% solids, with or without moderate preheating, say up to 140–150° F.

The drying temperatures employed to prepare the powdered products of the present invention from an aqueous paint dispersion must be below the sintering temperature of the powdered particle. More specifically, it has been found that this temperature can be above the sintering temperature of the resin binder in the paint but must be below that which will sinter the powder particle containing said resin binder along with the other solid constituents of the paint. This distinction is an important one because it permits the drying of the aqueous paint dispersions at substantially higher temperatures than heretofore employed for the spray-drying of aqueous compositions containing the same resin binders, e.g., emulsions, thereby achieving faster and more economical results. The utilization of drying temperatures above the sintering temperature of the resin binder for the aqueous paint dispersion is also surprising, since many of the compositions contain plasticizers and coalescing agents for said binder, the effect of which is to lower the sintering temperature of the binder.

The two-fluid nozzle can be of different types such as one to which the aqueous paint dispersion is charged at a pressure head of several feet. It can, however, also be of the type which draws the aqueous paint dispersion by suction. The high velocity air stream actually picks drops off the liquid nozzle and disintegrates them to form very fine droplets.

Redispersible powdered acrylic interpolymer paints were obtained with a dryer having a drying chamber about 5 feet in diameter and about 10 feet high. The spray-drying of these particular paints prepared with latices such as those taught in U.S.P. 2,795,564 had heretofore been thought unfeasible because of the unusually low sintering temperature of such resins. The present process allows the use of inlet air temperatures between 100–160° F., secondary air temperatures of 100° to 125° F. and outlet air temperatures ranging from 75° to 125° F. Because of the presence of water at that stage, the temperatures of the inlet air and that of the secondary air may be much higher than that of the outlet air and can be regulated with the liquid paint feed rate in order to achieve the desired outlet air temperature. Also because of the variety of acrylic interpolymer bases which may be spray-dried within these temperature limits, the actual air temperatures within the above ranges which are best suited for a particular paint formulation may readily be determined by simple experiment, the principal test being the redispersibility of the dried powder.

The invention will be described in more detail by reference to the following example which disclose some of its preferred formulations and procedures. The compositions shown are based on weight percent unless otherwise mentioned.

*Example 1*

An interior top coat white paint comprising an unplasticized acrylic resin binder was prepared according to the usual methods, having the following composition:

Pigment slurry:
    Water _____ 60
    Surfactant: Alkyl, Aryl Ether (Triton CF-10) _____ 2
    Dispersing agent: Sodium salt of polycarboxylated condensed naphthalene (Tamol 731) _____ 15
    Solvent: Ethylene glycol _____ 15
    Defoamer: Aliphatic substituted butynediols and octynediols (Surfynol 104W) _____ 2
    Pigment: Titanium dioxide _____ 200
    Pigment extender: Calcium carbonate _____ 385
    Preservative (Butrol) _____ 1
Paint base:
    Water _____ 230
    Binder: 46% solids thickened aqueous dispersion of acrylic resin binder made according to U.S.P. 2,795,564, Example 1 _____ 325
    Thickener: 28% solids emulsion of a cross-linked acrylic emulsion _____ 14

1249

The acrylic resin binder is an interpolymer made of about 66% by weight of ethyl acrylate units, about 33% by weight of methyl methacrylate units and about 11% by weight of methacrylic acid units.

The above liquid paint composition was formulated at room temperature by preparing the paint base and pigment slurry components separately, then mixing the components by combining them with agitation and subsequently passing the mixture through a Morehouse Mill to yield a stable uniformly fine particle size aqueous dispersion paint. Accordingly, the water, solvent, dispersing agent, thickener mixture and surfactant mixture constituents of the pigment slurry were first charged into a suitable vessel and while agitating this mixture the pigments and pigment extender constituents of the pigment slurry were sifted into the mixture and agitated for 20 minutes obtaining a lump-free, smooth mixture. The separate preparation of the paint base was accomplished by first mixing the water and thickener together, thereafter adding this mixture to the binder emulsion with rapid agitation and maintaining moderate agitation for 30 minutes. The paint base was then stirred into the pigment slurry and agitated for 30 minutes to yield a completely homogeneous mixture. The paint was passed once through a Morehouse Mill set at a one mill clearance to achieve the desired fineness of grind.

The above liquid paint composition was dried in a five foot diameter drier of the general type described. The solids concentration of the paint was reduced to 49.2% before drying by mixing with water, in order to facilitate passage through the apparatus. The diluted liquid paint composition was charged to the two-fluid nozzle at a pressure head of several pounds per square inch. The primary air charged to the nozzle was under 6 pounds per square inch pressure. The temperature of the primary inlet air was approximately 120° F. and the secondary inlet air temperature was approximately 100° F. The rate of diluted paint feed was also controlled so as to aid in maintaining the outlet air temperature or drying temperature at approximately 93° F.

The product was a dry free-flowing powder that redispersed to give a paint comparable to the original. When applied the redispersed paint leveled well and the film, air-dried at room temperature, was flexible and possessed excellent scrubability. The brightness of the paint film was greater for the substituted emulsion than for the original composition.

*Example 2*

Another white paint comprising an acrylic interpolymer resin binder was prepared according to the method described in Example 1, having the following composition:

Paint base:
    Solvents:
        Hexylene glycol _____ 10
        Ethylene glycol _____ 35
    Water _____ 15
    Surfactant: Alkyl, aryl sodium sulfonate (Santomerse No. 3) _____ 2
    Binder: Aqueous dispersion of acrylic resin binder made according to U.S.P. 2,795,564, Example 10 _____ 300
Pigment slurry:
    Water _____ 215
    Thickener: Methyl cellulose (2% aqueous solution, 4000 cps.) _____ 190
    Dispersing agent: Sodium salt of polycarboxylated condensed naphthalene (Tamol 731) _____ 20
    Pigment: Titanium dioxide _____ 225
    Pigment extenders:
        Clay _____ 62
        Calcium silicate _____ 50
        Calcium carbonate _____ 60

1185

The above composition was mixed and spray-dried substantially according to the method described in Example 1. The drying conditions were a primary air temperature of 150° F., a secondary air temperature of 110° F. and an outlet air temperature of 105° F. The feed concentration was 45% solids. A free flowing powder was obtained which was equivalent to the original liquid paint composition upon redispersion.

*Example 3*

Another paint was prepared exactly according to Example 14 of U.S. Patent 2,795,564.

Pigment slurry:              Parts by weight
    Titanium dioxide _____ 266.2
    Lithopone _____ 76.0
    Mica _____ 51.5
    Silica _____ 80.7
    Formaldehyde - condensed sodium naphthalene sulfonate _____ 6.8
    Diethylene glycol _____ 7.2
    Water _____ 189.5
Binder:
    46% solids aqueous acrylic binder dispersion of Example 1 _____ 516.0

1193.9

All but the last ingredient were mixed and ground on a roller mill to a smooth, uniform paste. The paste was then mixed with the acrylic binder dispersion. The resulting paint was diluted to a solids content of 35% by weight and spray dried according to the method of Example 1. The temperatures used were: primary air inlet temperature: 120° F. secondary air inlet temperature: 115° F. and outlet air temperature: 101° F. The redispersible powder obtained had properties substantially similar upon dilution to the original liquid paint.

The powdered paints produced by the method of the present invention have a moisture content of no more than 4% by weight which upper limit is critical to insure freedom from caking during storage and the consequent loss of the redispersibility characteristic. The powdered paints comprise discrete powder particles each containing a relatively large number of individual resin binder particles having a size in the order of 0.05 to 8 microns and being separated by the non-resinous solids of the aqueous paint dispersion. These products can be prepared from aqueous paint dispersions having a solids composition comprising about 20 to 80% by weight of an acrylic film-forming interpolymer, about 80 to 20% by weight of a pigment and extenders therefor, about 0.5 to 5% by weight of a thickener, and about 0.05 to 1.0% by weight of a dispersing agent. Optionally the aqueous paint dispersion can contain from about 5 to 20% by weight of the film-forming polymer of plasticizers and coalescing agents therefor. The composition of a substantial portion of the individual powder particles is representative of the solids composition of the paint.

More particularly, the film-forming component of the paints that may be successfully spray dried by the method of this invention are water insoluble interpolymers formed with (A) units having carboxylic groups derived from a polymerizable carboxylic acid having $\alpha,\beta$-unsaturation in a vinylidene group, (B) units from at least one neutral, free radical-polymerizable ester having a vinylidene group attached to the functional group, which ester by itself yields a soft linear polymer, and (C) units from at least one neutral polymerizable monovinylidene compound which by itself yields a hard polymer. These interpolymers and the type of paints which can be submitted to the instant process are amply described in U.S.P. 2,795,564 which is hereby incorporated by reference.

The useful pigments are characterized as being dispersible but not soluble in water, and generally not chemically reactive with the other constituents in the composition. Certain reactive pigments are suitable where there is a very limited reactivity. Such reactivity can be limited to those useful to control pH. The optimum particle size of the pigment is 0.4 micron average diameter. When the pigment particle diameter exceeds approximately 2 microns, there is difficulty in dispersing the pigment. The useful extenders may be characterized as having the same physical and chemical properties as the pigment with the exception that they possess low hiding power. Their chief advantage is an economic one; namely, that of raising pigment-volume-concentration (P.V.C.) without increasing the cost substantially. Although the compositions of the invention which can be spray dried can tolerate a certain amount of reactivity of the pigment, suitable extenders are essentially those which are non-reactive. Pigments and pigment extenders are well known in the paint art and their function is mainly that of inert agents in the film compositions serving essentially as opacifiers, colorants, body agents, and the like.

Suitable prime pigments are, for example, rutile titanium dioxides, particularly those sold under trademark names "Titanox RA–50," "R–750," "Zopaque R–33," "Unitane OR250," "R–710."

Preferred pigments which are found to give good results are the so-called "water-dispersible" grades of pigment. The product known as "Titanox C–50" which is an extended titanium dioxide gives especially good results.

The preferred extender type pigments are clays, micas, silicas, and talcs. It is preferably that the dried type is employed; for example, dried ground mica is better than the water-ground type. Calcium carbonate while employable is not preferred but "Micro-Velva L" which is a mixed product of calcium carbonate, aluminum silicate, and magnesium silicate, is preferred.

Extenders which may be employed include the following: calcium silicates, particularly "Wollastonite P–4," clays, particularly those sold under trademark names "ASP," "Hydrite"; micas, particularly water-ground mica, sold under the proprietary name "Alsibronz No. 12," and dried-ground mica sold under the trademark name "Mineralite 3X"; silicas, particularly the product sold under the trademark names "Celite," "Gold Bond R," "Hi-Sil 233"; and talc, particularly those sold under the trademark names "Nytal 300," and "HGO–55."

It is preferred when using pigments and/or extenders that these agents not exceed 2 microns average diameter, in order to give a smooth appearance to the film.

Useful thickeners or stabilizers, as they are sometimes called, can best be defined by their function in the liquid dispersions from which the dry powders are obtained. The primary purpose of the thickener in the dispersion is to increase the viscosity of the water phase in the dispersion.

Useful thickeners can be selected from the class of hydrophilic colloids generally, but may include finely divided inert particulate solids. For example, preferred thickeners are the finely divided silica and borated alginate types, although cellulosics such as carboxymethylcellulose may also be employed. Examples of the types of thickeners which are effective are methyl cellulose, sold under the name "Methocel," carboxymethylcellulose, sold under the brand name "CMC, Type 70, LV," hydroxyethylcellulose, sold under the name "Cellosize WP–09," low viscosity, partially hydrolyzed, polyvinyl alcohol, sold under the name "Gelvatol 40–10," borated alginate, sold under the name "Burtonite X–90," guar gum, sold under the name "Burtonite No. 7," methylated guar gum, sold under the name "Burtonite No. 77," and silica, sold under the name "Hi-Sil 233."

The coalescing agents which were illustrated in the preceding examples are well known in the art. They are also known by the terms filming agents and conditioning agents. The preferred class of coalescing agents are water-soluble and can be selected from the class of glycols, glycol ethers, and esters of glycol ethers including hexylene glycol, ethylene glycol, diethylene glycol monoethyl ether (sold under the trademark "Carbitol"), ethylene glycol monoethyl ether (sold under the trademark "Cellosolve"), propylene glycol, "Cellosolve" acetate, butyl "Carbitol" acetate, and the like. The class of suitable coalescing agents can be selected from the general class of solvents for the resinous binder and can be more specifically characterized as those which are water-miscible and compatible with aqueous dispersions of the resinous binder so that the resin particles are not precipitated by addition of the solvent. Suitable coalescing agents may be further characterized as those which are sufficiently non-volatile so as to remain present in the dry powdered mixture during the entire storage period and for a reasonable period after redispersion of the mixture of the wet film.

The dispersing agents which are suitable in the present compositions can be selected from the general class of organic water-soluble surfactants which have good dispersing properties and which are compatible with the resin binder. Useful dispersing agents include the nonionic type, for example, the block copolymer of ethylene oxide-propylene oxide, available commercially by the trademark "Pluronic L62," the anionic type, for example, the dioctyl ester of sodium sulfosuccinic acid, available commercially under the trademark "Aerosol OT," and the sodium salt of a polycarboxylated condensed naphthalene, available commercially as "Tamol 731," and the cationic type, for example, tertiary amines, particularly a trademarked product known as "Ethomeen C15," which has alkyl groups derived from coco amine, contains 5 ethylene oxide units and has a molecular weight average of 437.

It is not intended to limit the present invention exclusively to the spray-drying of the compositions disclosed in the above examples. It will be obvious to the man skilled in the art that other powdered paint compositions can be obtained by the practice of the invention. For example, in addition to such optional constituents for paints as the coalescing agents, fungicides, and preservatives shown in the preceding examples, it is also possible to modify the original liquid compositions by the incorporation of other additives so as to obtain desired properties in the dried films obtained from the redispersions and still be able to spray the original liquid compositions. Hence, inert materials such as sand and other texturing agents may be incorporated into the original liquid dispersion in order that the redispersion may be used as a texture finish. It is also not intended to limit the products of the present invention to paint applications merely. It is obvious that dry powders of the present invention can be used as patching compounds merely by controlling the amount of water added during reconstitution.

What is claimed is:
1. A method for converting an aqueous coating composition into a redispersible dry powder, which comprises:
    (1) atomizing an aqueous acrylic interpolymer paint composition containing from 25 to 65% by weight of total solids;
    (2) introducing the atomized spray into a drying chamber by means of an air stream heated to a temperature selected from the range of 100 to 160° F.
    (3) while maintaining the outlet air temperature between 75 and 125° F. by means of a secondary air stream;
    (4) conducting the atomized spray through the drying chamber so that the moisture content is reduced to not more than 4% by weight before the spray is discharged from the chamber;
    (5) and recovering the dried solids which comprise (a) about 20 to 80% by weight of a film-forming resin binder which is an interpolymer made of about 66% by weight of ethyl acrylate units, about 33% by weight of methyl methacrylate units and about 1% by weight of methacrylic acid units; (b) about 80 to 20% by weight of pigments and extenders having an average particle diameter of not greater than 2 microns; (c) about 0.5 to 5% by weight of a thickener and (d) about 0.5 to 1% by weight of a dispersing agent.

2. A redispersible resin binder paint spray dried according to the method of claim 1.

3. A method as in claim 1 whereby the atomizing step (1) is carried out by a two-fluid technique.

4. A method as in claim 3 whereby the atomization is carried out by discharging directly a low velocity stream of the aqueous coating composition into an air stream heated to a temperature selected from the range of 100 to 160° F. and of sufficiently higher velocity to form an atomized spray.

References Cited
UNITED STATES PATENTS

| | | | |
|---|---|---|---|
| 2,227,163 | 12/1940 | Starck et al. | 260—29.6 |
| 2,800,463 | 7/1957 | Morrison | 260—29.6 |
| 3,104,234 | 9/1963 | Bray | 260—17.4 |

WILLIAM H. SHORT, *Primary Examiner.*

J. NORRIS, *Assistant Examiner.*